June 4, 1935.   H. H. VAIL   2,003,322
AUTOMATIC CLUTCH
Original Filed Nov. 29, 1927   2 Sheets-Sheet 1
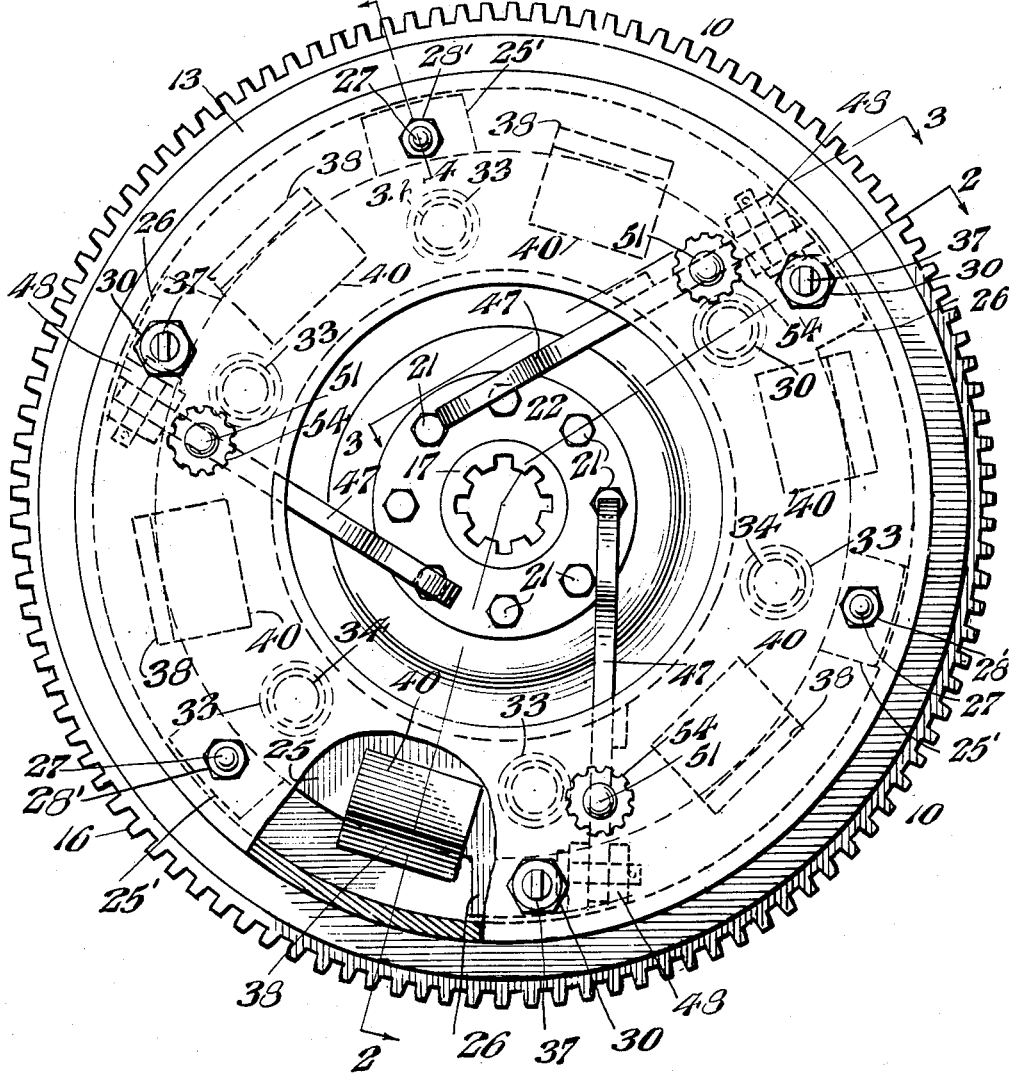
INVENTOR:
Henry H. Vail,
BY Robert M. Barr.
ATTORNEY

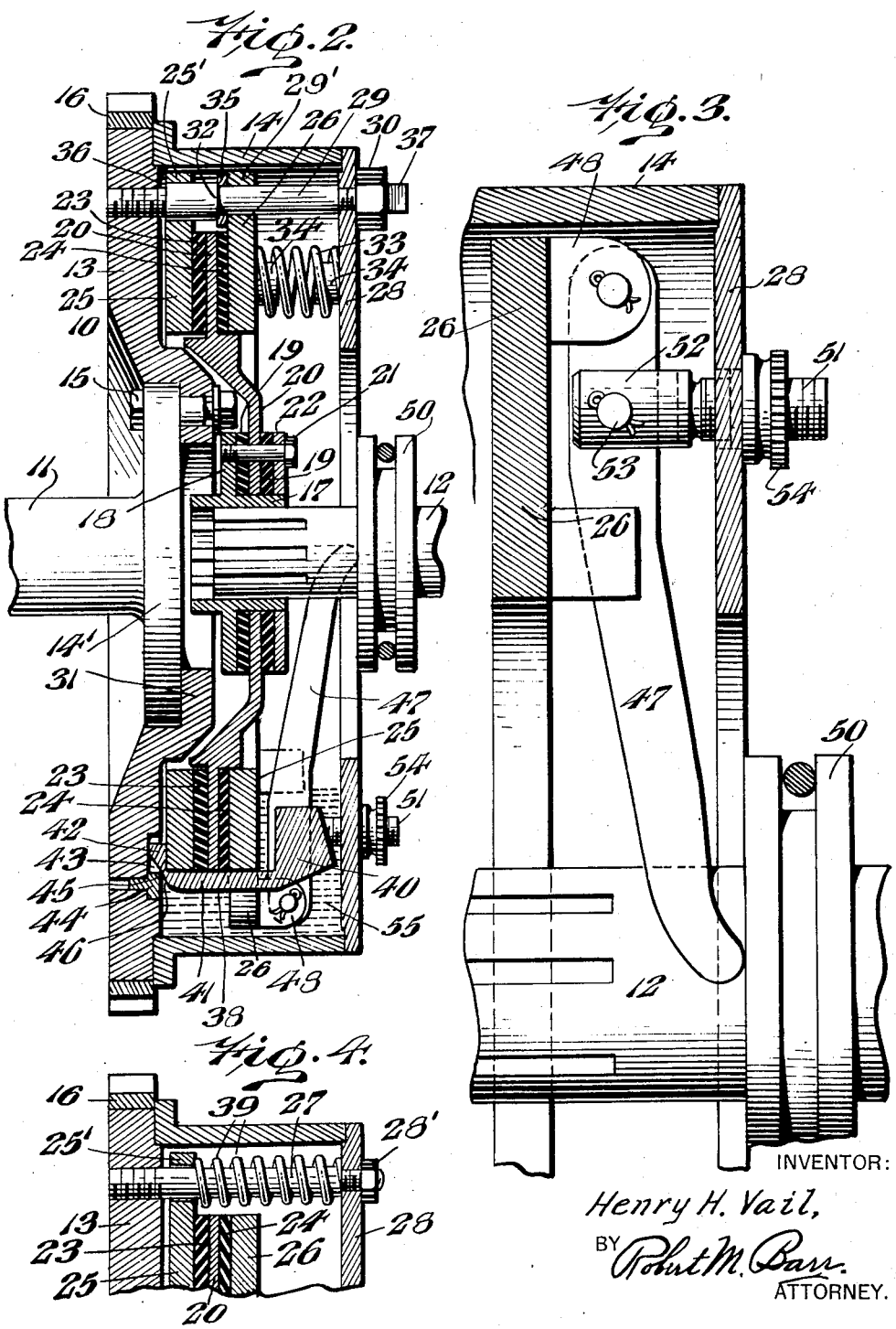

Patented June 4, 1935

2,003,322

UNITED STATES PATENT OFFICE 2,003,322

AUTOMATIC CLUTCH

Henry H. Vail, Camden, N. J., assignor to Automatic Drive and Transmission Company, Gloucester City, N. J., a corporation of New Jersey Application November 29, 1927, Serial No. 236,419
Renewed May 12, 1932

18 Claims. (Cl. 192—105)

The present invention relates to power transmitting devices and more particularly to an automatically controlled clutch for automobiles and motor vehicles.

Some of the objects of the present invention are to provide a complete, unitary, compact clutch assembly embodying an automatic control therefor; to provide an automatic control mechanism including a clutch which as assembled is substantially the same size as an ordinary manually controlled clutch and can be substituted in an automobile for such ordinary clutch; to provide a control for clutches which can be quickly and easily adjusted in case of wear or for other reasons, and does not require any disassembling of the clutch parts; to provide a control for automobile clutches which is automatic in its action but which leaves the manual control of the clutch free to be operated at the will of the user; to provide an improved clutch mechanism which functions in accordance with the speed of the engine with which it is associated; and to provide other improvements as will hereinafter appear.

In the accompanying drawings, Fig. 1 represents a side elevation of an automatic clutch embodying one form of the present invention, a portion thereof being broken away for a clear showing of the parts; Fig. 2 represents a section on line 2—2 of Fig. 1; Fig. 3 represents a sectional detail of one of the manually operated declutching levers; and Fig. 4 represents a detail section on line 4—4 of Fig. 1.

Referring to the drawings, a compact unitary automatically controlled clutch unit 10 is shown whereby power is transmitted from a driving shaft 11 to a driven shaft 12 through a clutch. The unit 10, which embodies one form of the present invention, consists of a fly-wheel disc 13 and housing 14 attached thereto, which together form the fly-wheel structure secured to the driving shaft flange 14' by bolts 15 or other fastening means. The disc 13 is employed also as a gear for self-starting purposes and to that end has teeth cut in a band or ring 16 secured to its periphery.

The driven shaft 12 has a hub 17 keyed thereto provided with a circumferential flange 18 which forms a backing plate against which a clutch plate 20 is rigidly held by bolts 21 passing through a clamping ring 22. Metal to metal contact between the parts is prevented by gaskets 19 interposed between the opposite sides of the plate 20 and the flange 18 and ring 22. Circumferentially, the clutch plate 20 is recessed at opposite sides to seat respectively annular discs 23 and 24 to wear resisting friction material which are respectively juxtaposed with respect to a movable clutching ring plate 25 and a backing ring plate 26. Thus the clutch plate 20 and the disc 23 and disc 24 lie between the plates 25 and 26, so that movement of one plate towards the other to contact with the discs 23 and 24 causes the desired clamping action whereby frictional clutching takes place and transmits motion to the plate 20 and thence to the driven shaft 12.

For transmitting the rotary motion of the fly-wheel disc 13 to the movable clutch ring plate 25, a plurality of bolts 27 are threaded into the disc 13 at circumferentially spaced intervals, and in the present instance three such bolts are shown having their outer ends passing through the housing end plate 28 so that they will hold the housing plate clamping the housing 14 against the disc 13 by means of nuts 28'. It will be understood that the ring plate 25 has radial projections 25' through which the respective bolts 27 are passed with just enough clearance to allow free sliding movement of the plate 25 on these bolts 27.

For transmitting the rotary motion of the fly-wheel disc 13 to the ring plate 26, axially adjustable posts 29 are threaded into the disc 13 at suitable distances apart passing through ears 29' on ring plate 26 and projecting through the housing end plate 28 to receive nuts 30. These posts 29 are radially located beyond the periphery of the clutch plate 20 so as not to interfere with its operation. It should be noted that the fly-wheel disc 13 preferably has a hub 31 which is encircled by the ring plate 25, whereby the thickness of the parts is reduced to a minimum and a compact structure provided. Each post 29 at the same distance from an end is provided with a shoulder 32 which serves as an abutment and limit stop for the backing plate 26 which is held against the shoulders 32, to resist the clutching pressure of the plate 25, by coil springs 33. These springs 33 are held under compression between the backing plate 26 and the housing end plate 28 and are prevented from springing out of position by studs 34 projecting respectively from the faces of the two plates 26 and 28. Preferably, washers 35 are interposed between the plate 26 and the respective shoulders 32. In connection with the posts 29, it should be noted that the initial setting of the backing plate 26 is made so as to leave a clearance 36 between the body of the post and the fly-wheel disc in order that adjustment can be made in case of wear between the clutch faces. To readily turn the posts 29 to make this adjustment, the projecting end of each is squared as shown at 37 to receive a wrench or other tool. Thus in adjusted position, the backing plate 26 is held spring pressed against the post shoulders 32 and in such close proximity to the face of the disc 24 that a relatively slight linear movement of the latter will cause frictional contact between the parts.

For the purpose of automatically shifting the clutch ring plate 25 to produce a frictional gripping force which is proportioned to the speed of rotation of the driving shaft 11, a plurality of centrifugally operated weights 38 are provided, six being here shown and arranged at equi-spaced distances about the circumference of the flywheel disc 13. The ring plate 25 is normally held in its declutched position by the provision of coil springs 39, which respectively encircle the bolts 27 and are compressed between one face of the plate 25 and the inner face of the housing plate 28. In addition to pressing the plate 25 to declutched position, these springs also maintain the centrifugal weights 38 in non-operating position at idling speeds and thus ensure non-engagement of the clutch except under operating speed conditions. Each of these weights 38 consists of a weight head 40, a body 41 and an offset tail-piece 42, the distance between the head 40 and tail-piece 42 being such as to allow the weight to fit over the combined rim formed by the plates 25 and 26, the clutch plate 20 and friction discs 23 and 24. The inner face of the flywheel disc 13 is provided with a plurality of bearing sockets 43 so spaced as to receive the respective tail-pieces 42, while studs 44 are respectively secured to the disc 13 in position to form fulcrum edges 45 for the respective weights 38. In assembled condition, each weight body 41 lies close to the rim of the plate structure while its tail-piece 42 rests against a face of the ring plate 25, being so held by the position of the fulcrum stud 44. Also that portion 46 of the tail-piece 42 which engages the fulcrum edge 45 is of arcuate shape to permit the free swing of the weight 38. Those surfaces of tail-pieces or arms 42 of weight bodies or levers 41, which engage behind plate 25, are termed actuating surfaces or faces as they actuate or force plate 25 into engagement with the driven member (disc 20 and facings 23 and 24) when levers 41 rock outwardly in response to centrifugal force. The initial adjustment of the clutch plates is such that at idling speeds of the motor the pressure of the weights 38 is insufficient to move the plates through the initial clearance against the action of springs 39 to produce friction for power transmitting purposes. However, when the motor attains the speed necessary for running conditions, the weight heads 40 swing outwardly to thereby rock the tail-pieces 42 about fulcrum edges 45 as axes in the direction to press and hold the clutch plate in clutching and power transmitting relation with the driven clutch plate parts.

In order to shift the parts to declutching position at will, a plurality of levers 47 are provided, one end of each of which is connected to a separate pair of ears 48 mounted upon the outer face of the backing ring plate 26, the said pairs of ears 48 being arranged about the circumference of the plate 26 in such positions as to project the free ends of the levers 47 into the path of movement of the shift collar 50 which is controlled by the manually operable clutch pedal of the automobile. Each of the levers 47 is provided intermediate its length with a fulcrum in the form of a stud 51 having a bifurcated end 52 straddling the lever 47 and pivoted thereto by a pin 53. The studs 51 pass through the housing end plate 28 and are received in adjusting nuts 54 whereby the proper setting of the levers 47 with respect to the shift collar 50 can be made.

In assembling the parts for operation, the posts 29 are all set in such a position that the shoulders 32 lie in the same plane and at such a distance from the fly-wheel as to initially position the backing ring plate 26 so that a clearance 36 is provided between plate 26 and the fly-wheel disc 13. The backing clutch ring plate 26 is held in this position by the pressure of the springs 33, as has been heretofore explained. The present novel construction permitting ease of assembling is an important feature of the invention since thereby it now becomes possible to install the automatic clutch mechanism without dismantling and removing the fly-wheel and its housing for that purpose. One reason for this ease of assembly is the fact that there is no prohibitive spring tension to overcome because the springs are placed under compression by the bolting on of the cover plate 28. In operation, the fly-wheel disc 13 is driven by the driving shaft 11 and transmits rotary movement to the ring plate 25 by the bolts 27 and to the plate 26 by the posts 29, as well as to the weights 38 which are carried by the fly-wheel. When the prime mover is operating at or below a predetermined idling speed, the parts appear as they are seen in Figure 2, and under these conditions shafts 11 and 12 are uncoupled or disconnected. When the engine speed reaches that necessary for running conditions, the centrifugal effort of the weights 38 overcomes the action of the springs 39 and they rock outwardly about edges 45 as axes and shift the clutch plate 25 to the right of the position in which it is disposed in Figure 2 in an axial direction, so that it not only contacts with the friction disc 23 but causes the clutch plate 20 to also move in the same direction on the driven shaft 12 and thereby bring the friction disc 24 into frictional engagement with the backing plate 26. In this way, the parts of the clutch plate 20 are frictionally clamped between the plates 25 and 26 so that their motion is transmitted to the clutch plate 20 to drive the driven shaft 12. Thus, the speed of the motor bears a direct relation to the clutching action transmitted by the action of the centrifugal weights 38 and yet there is not such a positive drive as to require shifting to second gear in case the road resistance is greater than the engine torque. Where the road resistance tends to exceed the developed torque, the decreased speed of the clutch driving parts will cause a momentary slippage between the clutch plates until the engine speed is automatically increased to take care of the added road resistance.

When weights 38 fulcrum, or rock outwardly about fulcrum edges 45 as axes in response to acceleration of flywheel 13, frictional resistance to their movement is small, because their bearing faces 46 are disposed in contact with fulcrum edges 45 throughout their operation, and the action is of a knife-edge pivotal character. The sliding action that takes place between tail-pieces 42 and the face of plate 25 during operation of weights 38 is small, in view of the fact that fulcrum edges 45 are disposed closely adjacent a plane that is normal to the axis of the mechanism and that contains the tail-piece-engaging face of plate 25 when the motor is idling. As the result of this relationship, the movement, of these portions of tail-pieces 42 that contact plate 25, is substantially parallel to the axis of the mechanism and accordingly parallel to the direction of travel of plate 25, throughout the major portion of the range of operation of weights 38. This is especially true when weights 38 are just commencing to rock, at which time a smooth frictionless operation is particularly desirable, because it is during this period that the plates are being brought into initial frictional engagement. On the other hand, if substantial friction were present in the mechanism, the plates might be brought into engagement with a harsh and grabbing action, and driven shaft 12 would then be picked up in an uneven manner.

Referring particularly to Figure 2, portions 40 of weights 38 are provided with bevelled faces that are adapted to contact the inner wall of housing member 14 when the flywheel attains a speed corresponding substantially to fully engaged speed. Weights 38, after they contact the housing, are thereby prevented from applying more than a definite predetermined pressure to the plates.

Should it become necessary at any time to operate the clutch manually, it can be thrown to declutching position as in the manner of an ordinary clutch by the operation of the clutch foot pedal which causes the shifting collar 50 to engage the ends of the levers 47 and thus withdraw the backing clutch plate 26 from the clutch disc 20 and against the tension of the springs 33. In order to maintain the clutch friction plates in effective condition and to provide for efficient operation, the housing is partially filled with oil, as indicated at 55, and the clutch plate ring faces either run directly in contact with the oil or receive oil by splash action so that at all times each face has its area coated with a light film of oil.

It will now be apparent that a complete unitary automatic clutch mechanism has been provided wherein the transmission of power from an engine or motor takes place without necessitating the shifting of gears in the transmission mechanism as ordinarily is required under different load conditions. The present structure automatically takes care of variations in load so that the transmission gearing can always be left in its high gear position and all driving takes place just as though no transmission were present. Where increased speed is desired or increased load conditions require the development of increased torque, this is taken care of by increasing the speed of the engine to meet such condition, while the centrifugally controlled clutch plates automatically function to transmit the power. Furthermore, there is no danger of the engine stalling under any conditions, which in itself is a highly advantageous feature because it removes the uncertainity of travel in traffic and grade conditions.

Having thus described my invention, I claim:

1. A clutch mechanism comprising a driving shaft, a fly-wheel connected to said driving shaft, a driven shaft, a clutch disc arranged to rotate said driven shaft, a clutch plate mounted to rotate with said fly-wheel but movable into and out of face contact with said disc, a backing plate on the opposite side of said disc from said clutch plate and mounted to rotate with said fly-wheel but movable towards and away from said disc, a housing connected to said fly-wheel and enclosing said plate and disc parts, abutment means in the path of movement of said backing plate to limit the movement of said backing plate towards said disc, a plurality of springs holding said backing plate against said limit means, centrifugal devices for controlling the movement of said clutch plate whereby the frictional engagement of said plates with said disc varies with the speed of rotation, and manually operable means for shifting said backing plate to declutched position.

2. A clutch mechanism comprising a driving shaft, a fly-wheel connected to said driving shaft, a driven shaft, a clutch disc arranged to rotate said driven shaft, a clutch plate mounted to rotate with said fly-wheel but movable into and out of face contact with said disc, a backing plate on the opposite side of said disc from said clutch plate and mounted to rotate with said fly-wheel but movable towards and away from said disc, a housing connected to said fly-wheel and enclosing said plate and disc parts, abutment means in the path of movement of said backing plate to limit the movement of said backing plate towards said disc, a plurality of springs holding said backing plate against said limit means, centrifugal devices for controlling the movement of said clutch plate whereby the frictional engagement of said plates with said disc varies with the speed of rotation, and means including a plurality of levers projecting into the path of a manually movable member for shifting said backing plate to declutched position.

3. A clutch mechanism comprising a driving shaft, a fly-wheel connected to said driving shaft and having an annular flange at one side forming a circumferential housing, an end plate for closing the open end of said housing, a plurality of posts projecting axially from said fly-wheel and connected to said end plate, a clutch plate and a backing plate slidably mounted on said posts, a driven shaft, a clutch disc connected to said driven shaft and having a circumferential portion between said plates, a plurality of springs interposed between said end plate and said backing plate to hold the latter in a predetermined position, and a plurality of centrifugally operated devices for moving said clutch plate for frictionally engaging said clutch disc and said backing plate.

4. A clutch mechanism comprising a driving shaft, a fly-wheel connected to said driving shaft and having an annular flange at one side forming a circumferential housing, an end plate for closing the open end of said housing, a plurality of posts threaded into said fly-wheel and connected to said end plate, shoulders respectively formed on said posts at a predetermined distance from one end, a clutch plate and a backing plate slidably mounted on said posts, a driven shaft, a clutch disc connected to said driven shaft and having a circumferential portion between said plates, a plurality of coil springs compressed between said backing plate and said end plate to hold said backing plate against said shoulders, and a plurality of centrifugally operated devices for moving said clutch plate for frictionally engaging said clutch disc and said backing plate.

5. In combination with a fly-wheel, a driven shaft, a normally free friction clutch device carried by said driven shaft, a centrifugally operated master plate located between the friction device and the fly-wheel, a pressure plate located on the opposite side of said friction device, and adjusting means mounted on said fly-wheel for adjusting the position of said pressure plate with respect to said master plate said adjusting means being located between said fly-wheel and said pressure plate.

6. In combination, a fly-wheel, a driven shaft, a friction clutch device carried by said shaft, a master plate located between said device and said fly-wheel, a pressure plate located on the opposite side of said clutch device, a plurality of adjusting means carried by said fly-wheel, each of said adjusting means comprising a bolt screw threaded into said fly-wheel and having a shoulder for engagement with said pressure plate whereby the position of said pressure plate with respect to said fly-wheel may be adjusted.

7. In combination, a fly-wheel, a driven shaft, a friction clutch device carried by said shaft, a master plate located between said device and said fly-wheel, a pressure plate located on the opposite side of said clutch device, a plurality of adjusting means carried by said fly-wheel, each of said adjusting means comprising a bolt screw threaded into said fly-wheel and having a shoulder for engagement with said pressure plate whereby the position of said pressure plate with respect to said fly-wheel may be adjusted, and means for locking said adjusting bolts.

8. In combination a fly-wheel, an annular cover plate attached thereto, a master plate, a friction device, a pressure plate and means for attaching said cover plate to said fly-wheel and preventing rotation of said master plate and said pressure plate with respect thereto, and adjusting means for said pressure plate screw threaded into said fly-wheel and passing through said cover plate and locked against rotation by means engaging said cover plate.

9. In combination, a fly-wheel, a driven shaft, a friction clutch device carried by said shaft, a master plate located between said device and said fly-wheel, a pressure plate located on the opposite side of said clutch device, and means mounted on said fly-wheel for preventing rotation of said plates relative thereto, said means also providing adjustable stops to limit the movement of the pressure plate towards said fly-wheel said means comprising a plurality of pins adjustably mounted in said flywheel and having shoulders located between said fly-wheel and said pressure plate.

10. In combination, a fly-wheel, a driven shaft, a clutch device carried by said shaft, a master plate located between said fly-wheel and said clutch device, a pressure plate located on the opposite side of said clutch device, and means comprising a plurality of adjustable pins mounted on said fly-wheel and provided with shoulders to serve as stops to limit the movement of the pressure plate towards said fly-wheel.

11. In an automatic clutch mechanism, a pair of members mounted for rotation and for movement toward and away from each other; a plurality of elements having working portions disposed between said members; fulcrum edges provided on one of said members, and said elements having bearing portions thereon adapted to engage and rock about said fulcrum edges; and means, comprising centrifugal masses connected to said elements, for causing said elements to rock and thereby separate said members when the latter attain a predetermined speed.

12. The mechanism set forth in claim 11, wherein said fulcrum edges are formed on fulcrum elements secured to one of said members.

13. The mechanism described in claim 11, wherein said fulcrum edges are formed on fulcrum elements secured to one of said members, and said fulcrum elements cooperate with one of said members to define receptacle-forming recesses for receiving said working portions.

14. In an automatic clutch mechanism, a pair of members mounted for rotation and for movement toward and away from each other; a plurality of elements having working portions disposed between said members; one of said members having a plurality of receptacle defining recesses provided therein for at least partially receiving the working portions of said elements; fulcrum edges provided on one of said members, and said elements having bearing portions thereon adapted to engage and rock about said fulcrum edges; one of said members having means defining one wall of said recesses and forming said fulcrum edges.

15. The mechanism described in claim 14, wherein said fulcrum members are formed on fulcrum elements secured to one of said members.

16. In sub-combination, a flywheel; a cover secured to said flywheel; a member mounted for axial movement within said cover; a plurality of compression springs interposed between said member and the inner wall of said cover and normally urging said member away from said cover; means for moving said member toward said cover against the action of said springs comprising a plurality of levers extending across the face of said member; means for pivotally connecting said levers to said member and said cover; a throwout mechanism adapted to cooperate with said levers; means for individually adjusting said levers angularly with respect to said member and cover, whereby the angular position of said member with respect to said cover may be adjustably varied, and means, independent of said first-named adjusting means, for adjusting said member bodily toward and away from said cover without disturbing the individual adjustment of said levers.

17. In sub-combination, a centrifugally operable lever member; a reaction member against which said lever member is adapted to react, an element adapted to be actuated by said lever member, said reaction member and said element being mounted for rotation about a common axis, said lever member having a bearing portion and said reaction member having a fulcrum edge adapted to cooperate with said bearing portion and defining an axis about which said lever member is adapted to rock; said lever member having an actuating face lying closely adjacent a plane normal to said first-named axis and interesting said last-named axis.

18. In an automatic clutch, in sub-combination, a pair of members rotatable about a common axis and provided with cooperating opposed portions relatively shiftable toward and away from each other longitudinally of said common axis; said portions having substantially parallel surfaces forming a space therebetween; a lever having an arm disposed in said space between said opposed surfaces; one of said portions having an extension projecting away from its surface to engage said lever adjacent said arm to provide a rocking connection having an axis closely adjacent the plane of the surface of the other portion; whereby, as said lever swings outwardly in response to centrifugal action, said arm engages said other portion closely adjacent a plane containing the axis of said rocking connection and disposed normal to said first-mentioned axis.

HENRY H. VAIL.